United States Patent [19]

Halperin

[11] 4,003,628
[45] Jan. 18, 1977

[54] COARSE FOCUS MECHANISM FOR MICROSCOPES

[75] Inventor: Nathaniel Halperin, San Antonio, Tex.

[73] Assignee: Zale Corporation, Dallas, Tex.

[22] Filed: Nov. 10, 1975

[21] Appl. No.: 630,216

[52] U.S. Cl. .................................. 350/77; 350/46; 350/84; 64/30 C

[51] Int. Cl.² ..................... G02B 7/04; G02B 21/00; G02B 21/26

[58] Field of Search .................. 350/41, 44, 46, 74, 350/76, 77, 84; 64/30 R, 30 C

[56] References Cited

UNITED STATES PATENTS

| | | | |
|---|---|---|---|
| 3,451,739 | 6/1969 | Fitzgibbons | 350/84 |
| 3,683,704 | 8/1972 | Kuroha | 350/84 UX |

*Primary Examiner*—John K. Corbin
*Assistant Examiner*—Matthew W. Koren
*Attorney, Agent, or Firm*—Bacon & Thomas

[57] ABSTRACT

A coarse focus mechanism for microscopes and related instruments wherein the mechanism includes a slip clutch operated knob which rotates a pinion shaft for moving either the optical or stage member of the microscope relative to the other member for achieving a coarse focus. The knob is disposed on the pinion shaft between the slip clutch and an abutment which is laterally adjustable along the longitudinal axis of the pinion shaft for precisely positioning the knob on the pinion shaft. The knob may include a removable protective housing for enclosing the slip clutch mechanism.

11 Claims, 4 Drawing Figures

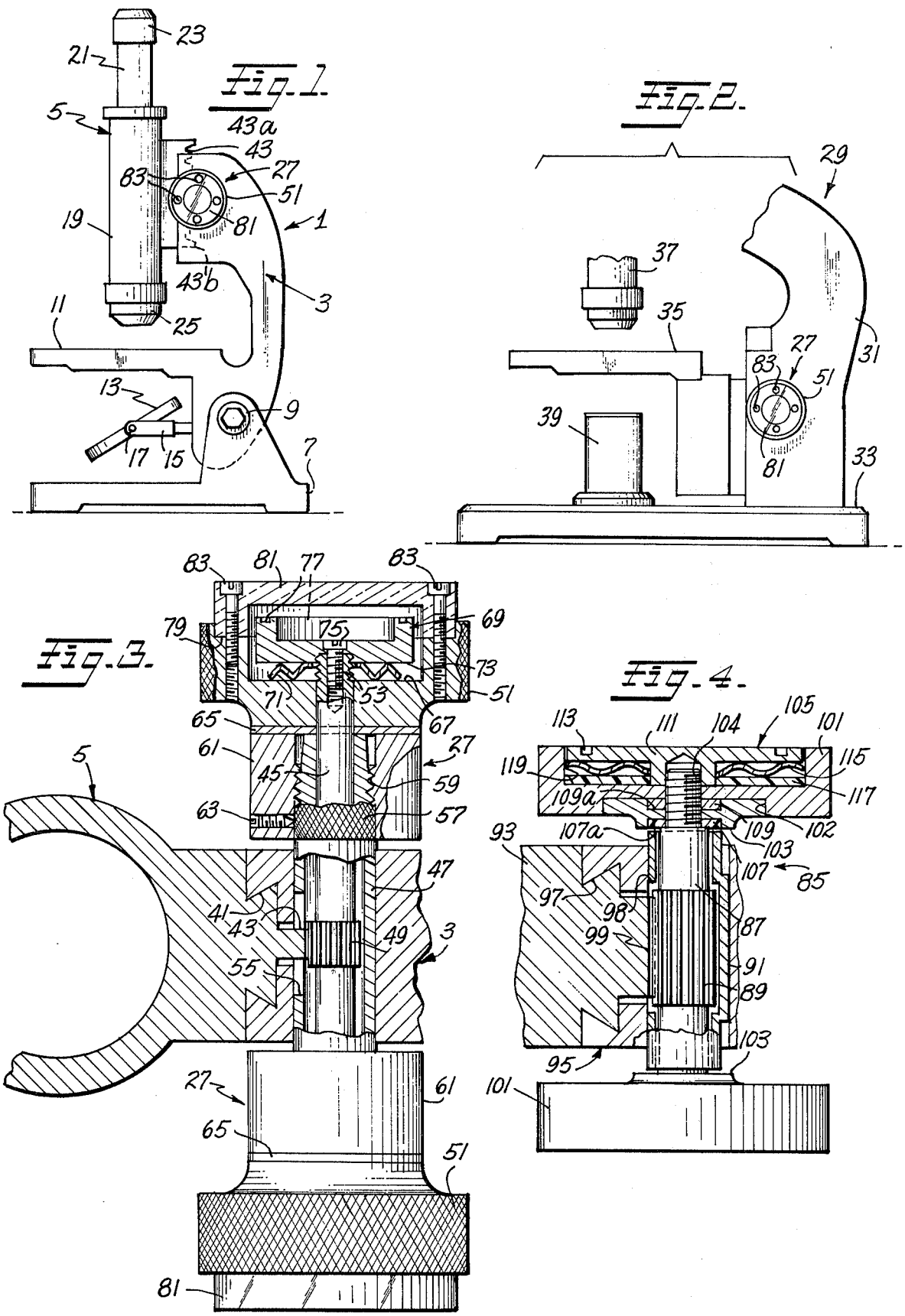

COARSE FOCUS MECHANISM FOR MICROSCOPES

BACKGROUND OF THE INVENTION

1. Field of the Invention

The present invention relates generally to the field of prior art encompassing focusing mechanisms for optical instruments. More particularly, this invention relates to a coarse focus mechanism for use with microscopes or similar instruments.

2. Description of the Prior Art

Microscopes and related devices are precision optical instruments which basically include a heavy frame that is designed to be placed on a table top or other such level surface, cooperating lens and stage members supported on the frame, and a means for moving either the lens member or the stage member with respect to the other member for the purpose of focusing the specimen being viewed through the lens member. Like the frame, both the lens and stage members are generally precision made from heavy materials. When a focusing mechanism is utilized to support and move either of these members, it is critical that such a mechanism be capable of supporting the heavy movable member as well as providing precise degrees of movement in order to achieve the basic coarse focus of the specimen under study.

The prior art has recognized that the coarse focus of a microscope may be achieved by means of a simple rack and pinion gearing arrangement between the focusing mechanism and the movable member. Such focusing mechanisms may include a rotatable pinion shaft having a pinion gearing thereon for cooperative engagement with a rack carried by either the lens member or the stage member. By providing stop means at the opposite ends of the rack and utilizing a slip clutch drive for the knob which operates the pinion shaft, damage to the microscope can be avoided since manual operating force applied against the extreme ends of travel of the movable member can be controlled. The Fitzgibbons U.S. Pat. No. 3,451,739 is exemplary of this latter concept.

In utilizing slip clutch drives in conjunction with the coarse focus mechanism of a microscope, it is highly desirable that the manually operated knob for effecting the focus be accurately positioned on the pinion shaft in order that the slip clutch can be precisely adjusted to control and limit the amount of torque imparted to the shaft through the knob. It is further highly desirable that this positioning of the knob be achieved easily and quickly and also in such a manner as to facilitate the ultimate assembly and disassembly of the entire knob and slip clutch mechanism for servicing purposes.

SUMMARY OF THE INVENTION

It is an object of the present invention to provide for a coarse focus mechanism for a microscope wherein the mechanism serves to achieve the coarse focusing of the microscope without the possibility of damage to the instrument.

It is another object of the present invention to provide a coarse focus mechanism having a knob and slip clutch assembly which can be precisely adjusted on the pinion shaft of the mechanism.

It is still another object of the present invention to provide for a coarse focus mechanism that can be easily and quickly assembled and disassembled for servicing purposes.

It is still yet another object of the present invention to provide for a coarse focus mechanism for a microscope wherein the mechanism includes a slip clutch and means for enclosing and protecting the slip clutch against unauthorized adjustment.

The coarse focus mechanism of the present invention includes a knob that is carried adjacent the end of a pinion shaft for free rotation with respect thereto. A slip clutch, including an expandable washer and spanner, is disposed on the end of the pinion shaft adjacent one side of the knob. An abutment is disposed on the other side of the knob. The abutment is capable of lateral adjustment along the length of the shaft in order to precisely locate and secure the knob in its desired position with respect to the slip clutch mechanism. After the abutment has been secured, the frictional resistance of the knob can then be accurately set by adjusting the slip clutch so that the frictional resistance created thereby permits rotation of the shaft when the knob is turned. The knob is caused to slip and rotate freely, independent of the shaft, when the resistance to rotation of the shaft exceeds the predetermined amount of frictional resistance imparted by the slip clutch. This situation normally arises when the rack and pinion drive for moving the movable member of the microscope reaches either of its extreme ends of travel, thereby preventing damage to the instrument.

Other objects, features and advantages of the present invention will be apparent from the following description of specific embodiments thereof, with reference to the accompanying drawings, which form a part of this specification, wherein like reference characters designate corresponding parts of the several views.

BRIEF DESCRIPTION OF THE DRAWINGS

FIG. 1 is a side elevational view of a microscope incorporating the coarse focus mechanism of the present invention;

FIG. 2 is a fragmentary side elevational view of a microscope incorporating the coarse focus mechanism of the present invention in a modified manner;

FIG. 3 is an enlarged fragmentary horizontal transverse sectional view, partly in elevation, depicting in detail the coarse focus mechanism of the present invention; and FIG. 4 is an enlarged fragmentary horizontal sectional view, similar to FIG. 3, partly in elevation, depicting the details of another embodiment of the coarse focus mechanism of the present invention.

DETAILED DESCRIPTION OF THE PREFERRED EMOBIDMENTS

Referring now to FIG. 1, a microscope 1 is shown having a frame 3 and an optical member 5 carried by frame 3 for movement with respect thereto. Frame 3 may be pivotally secured to a base 7 by a bolt assembly 9 or similar pivotal connection means. The specimen to be studied by microscope 1 is supported on a stage member 11 which is depicted as being an integral portion of frame 3. Stage member 11 may include the usual structural features well known in the art for securing specimens thereon so that the latter may be studied through optical member 5. A reflective member 13, such as a mirror or the like, is supported by a telescoping arm 15 carried by frame 3. Arm 15 permits horizontal adjustment of reflective member 13 with respect to the line of sight achieved through optical member 5. Further, reflective member 13 is secured to telescoping member 15 by means of a pair of pivot pins 17 or suitable fastening means to permit reflective member 13 to be advantageously angled so that light can be received and directed upwardly through stage member 11 and into optical member 5.

Optical member 5 may include an outer tube 19 which telescopically receives an inner tube 21. A first lens system 23 may be provided at the upper end of inner tube 21 for optical cooperation with a second lens system 25 carried at the lower end of outer tube 19. In addition, an internal lens system (not shown) may also be incorporated within either or both of outer and inner tubes 19 and 21, respectively.

Because stage member 11 is depicted as stationary with respect to frame 3, the coarse focusing of a specimen supported by member 11 for study under optical member 5 is achieved by moving the latter towards and away from stage member 11. This may be accomplished by providing a coarse focus mechanism, generally indicated at 27.

As seen in FIG. 2, a microscope 29 is shown having a frame 31 rigidly secured to a base 33. A stage member 35 is carried by frame 31 for movement with respect thereto. A stationary optical member 37 may be carried by frame 31. A light source 39 may be disposed directly below movable stage member 35 for directing viewing light therethrough and into optical member 37. Accordingly, the coarse focus of microscope 29 is achieved by moving stage member 35 towards and away from optical member 37 since the latter is stationary with respect to frame 31. As in the case of microscope 1 depicted in FIG. 1, the coarse focus of microscope 29 is also achieved through a coarse focus mechanism 27, which mechanism shall hereinafter be described in detail.

Referring now to FIG. 3, optical member 5 is slidably received in frame 3 through a standard dovetail slide joint 41 or any other suitable sliding connection well known in the art. A longitudinal rack 43 is provided along a portion of the length of optical member 5. This is more clearly shown in FIG. 1. The outer extremities of rack 43 is provided with a pair of overhanging lips 43a and 43b, the purpose of which will later become apparent.

Coarse focus mechanism 27 comprises a pinion shaft 45 which is rotatably journalled within frame 3 by means of a stationary coaxial shaft housing 47. Pinion shaft 45 is provided with a pinion gearing 49 which is in cooperative engagement with rack 43 carried by optical member 5. As is therefore apparent, clockwise or counter-clockwise rotation of pinion shaft 45 will cause optical member 5 to slide within dovetail joint 41 with respect to frame 3. However, the extreme ends of travel for optical member 5 are controlled by lips 43a and 43b on rack 43, as more clearly shown in FIG. 1. The engagement of either lip 43a or lip 43b onto gearing 49 provides a definitive stop against the rotation of pinion shaft 45, thereby limiting the movement of optical member 5 with respect to frame 3 to a distance equal to that between lips 43a and 43b. The use of a rack and pinion arrangement for moving the optical member of a microscope is known and well exemplified by the aforementioned Fitzgibbons U.S. Pat. No. 3,451,739.

As seen in FIG. 3, pinion shaft 45 may extend laterally on either side of frame 3 and be provided with a knurled knob 51 at either or both ends thereof. In this manner, rotation of shaft 45 can be achieved by either a left or right-handed individual. For purposes of exemplification, the structure pertaining to coarse focus mechanism 27 for one half of pinion shaft 45 shall now be described, but it is to be understood that the other half of shaft 45 may incorporate the same structure.

As clearly shown in FIG. 3, pinion shaft housing 47 is provided with an opening 55 therein to permit engagement between rack 43 and gearing 49. Either or both ends of pinion shaft housing 47 extending laterally from frame 3 are provided with a circumferential knurled section 57 and a threaded section 59 directly adjacent thereto near the end of housing 47. An abutment member 61 is threadably received on the threaded section 59 of housing 47. Abutment 61 may take the form of a generally circular or ring-shaped structure. A set screw 63 in member 61 permits the latter to be locked in place onto housing 47 by bearing screw 63 down against knurled section 57. Knob 51 is journalled on the end of pinion shaft 45 for free rotation with respect thereto. Knob 51 is also disposed in adjacent or abutting contact with abutment member 61. This contact may be achieved directly between knob 51 and abutment 61, or a washer 65 may be disposed therebetween.

Knob 51 is provided with a coaxial recess 67 into which threaded end 53 of pinion shaft 45 extends to support a slip clutch drive assembly, indicated generally at 69. Assembly 69 comprises a frictional member 71 in the form of an expandable or wave washer and a spanner 73 for bearing against and applying pressure to one face of member 71. Spanner 73 is threadedly received on the end 53 of pinion shaft 45 and is provided with a set screw 75 to lock it in a desired position of threaded adjustment against member 71. Spanner 73 may assume a generally disc-shaped configuration and be provided with a plurality of circumferentially spaced notches 77 for receiving an appropriate tool to facilitate the adjustment of spanner 73 on pinion shaft 45.

As further shown in FIG. 3, knob 51 may be provided with an inwardly extending circumferential ledge 79 for receiving a circular housing 81. A plurality of screws 83 may be utilized to secure housing 81 against ledge 79, thereby enclosing and protecting slip clutch drive 69 against unwarranted adjustment or tampering. Housing 81 is preferably made of transparent plastic material and, in its installed position, be spaced from spanner 73 to permit room for adjustment of the latter.

Another embodiment of the coarse focus mechanism of the present invention is shown in FIG. 4. A coarse focus mechanism 85 includes a pinion shaft 87 provided with a pinion gear 89 thereon. Shaft 87 is rotatably received within a stationary coaxial pinion shaft housing 91 provided with an opening 98 therein. A movable member 93, be it an optical member or a stage member, is slidably received within frame section 95 by means of a dove-tail joint 97. A rack 99 carried by movable member 93 is in cooperative engagement with gear 89 through opening 98. Pinion shaft 87 is provided with a knob 101 which is received on the end of shaft 87 for free rotation with respect thereto. Disposed on either side of knob 101 are an abutment member 103, received within a recess 102 in knob 101, and a slip clutch assembly, indicated generally at 105. Abutment member 103 is threadedly received on a threaded end 104 of pinion shaft 87 and locked in a desired position of adjustment by means of a washer 107 and lock nut 109, both of which are received flush within correspondingly shaped recesses 107a and 109a, respectively, formed in the body of abutment member 103. In addition, washer 107 and lock nut 109 are both threadedly received on the threaded end 104 of pinion shaft 87. Slip clutch assembly 105 includes a disc-shaped spanner 111 provided with a plurality of circumferential notches 113 for receiving an appropriate adjustment tool. Spanner 111 is threadedly received on the end of pinion shaft 87 and bears against one face of a frictional member 115 which may be a wave or expandable washer. A washer 117 is disposed between the opposite face of washer 115 and knob 101 and effectively serves as a bearing surface against which washer 115 provides frictional engagement under the action of spanner 111. Slip clutch assembly 105 and washer 117 may be received flush within a recess 119 formed in the body of knob 101.

MODE OF OPERATION

The assembling of the coarse focus mechanism of the present invention and the utilization thereof for achieving the coarse focus of a specimen being studied under a microscope shall now be described for the first embodiment depicted in FIG. 3. Abutment member 61 is threaded onto pinion housing 47 and laterally adjusted along the length thereof until it is set in its desired position of adjustment. Set screw 63 is then tightened downwardly against knurled surface 57 to securely lock abutment member 61 on shaft housing 47. Washer 65 is then placed onto the end of shaft 45 until it is in abutting contact with abutment member 61. Knob 51 is then placed on shaft 45 until it comes into abutting contact with washer 65. Expandable washer 71 is received onto threaded end 53 of shaft 45 until one face thereof is brought into engagement with the bottom face of recess 67 formed within knob 51. Spanner 73 is screwed onto threaded end 53 until it is in abutting engagement with the other face of washer 71 to such a degree that washer 71 compresses, thereby providing frictional engagement against knob 51 which, in turn, frictionally engages washer 65 and abutment 61. By turning knob 51, pinion shaft 45 rotates and causes optical member 5 to be moved towards or away from stage member 11, depending upon the direction of rotation, through the cooperative engagement between rack 43 and gear 49. When an extreme end of travel of rack 43 has been reached, as indicated by the contacting of either lip 43a or 43b against gear 49, slippage of knob 51 about shaft 45 will occur if the resistance to rotation of pinion shaft 45 exceeds the predetermined amount of frictional resistance imparted by washer 71. At this point, the actual desired degree of frictional resistance can be set by tightening or loosening spanner 73 with respect to washer 71. Once this has been achieved, set screw 75 is then screwed into the end of shaft 45 to lock spanner 73 in its desired position. Housing 81 may then be secured onto knob 51 by screws 83 to prevent unauthorized adjustment of slip clutch assembly 69. By virtue of the lateral adjustability of abutment member 61, the precise positioning of knob 51 and its associated slip clutch assembly 69 can be easily facilitated so that the coarse focus of microscope 1 can be achieved in a manner that has heretofore not been possible with prior art systems of this nature.

Similarly, the mode of operation for the second embodiment of the present invention depicted in FIG. 4 requires only that abutment member 103 be laterally adjusted along the threaded end 104 of pinion shaft 87 to its desired position, at which point lock nut 109 is tightened against abutment member 103 and washer 107. Knob 101 is then placed on the end of pinion shaft 87 into abutting contact with member 103. Washer 117 is then placed against the bottom face of recess 119. Finally, slip clutch assembly 105 is secured in place by first placing expandable washer 115 into contact with washer 117 and threadedly securing spanner 111 against expandable washer such that the latter bears against washer 117 which, in turn, presses knob 101 against abutment member 103. By adjusting spanner 111 on end 104 of shaft 87 in the same manner as spanner 73 in the first embodiment, the coarse focus mechanism of this embodiment can similarly be preset at a desired frictional resistance.

It is to be understood that the forms of the invention herein shown and described are to be taken as preferred examples of the same, and that various changes in the shape, size, arrangement of parts and applications may be resorted to, without departing from the spirit of the invention or scope of the subjoined claims.

I claim:

1. A coarse focus mechanism for a microscope having a frame and cooperating optical and stage members carried by the frame, with at least one of the members being movable relative to the other member, which mechansim comprises, in combination:
   a. a pinion shaft for moving the movable member,
   b. a knob carried by the pinion shaft for rotating the pinion shaft in clockwise and counter-clockwise directions about its longitudinal axis,
   c. an abutment carried by the pinion shaft adjacent one side of the knob for frictional engagement therewith wherein the abutment is laterally adjustable along the longitudinal axis of the pinion shaft, and
   d. a variable slip clutch means carried by the pinion shaft adjacent the opposite side of the knob for pressing the knob against the abutment to thereby impart a predetermined amount of frictional resistance to the knob to permit rotation of the pinion shaft when the knob is rotated such that free rotation of the knob, independent of the pinion shaft, is realized when resistance to rotation of the pinion shaft exceeds the predetermined amount of frictional resistance.

2. The microscope of claim 1 wherein the variable slip clutch means includes:
   a. an expandable spring washer having one face disposed adjacent the knob, and
   b. an adjustable spanner for applying compressive pressure against the spring washer to thereby impart frictional resistance to the knob in direct proportion to the amount of compression applied against the spring washer.

3. The microscope of claim 2 wherein the adjustable spanner is threadedly received on one end of the pinion shaft.

4. The microscope of claim 1 wherein the abutment includes:
   a. a generally ring-shaped member coaxial with the pinion shaft, and
   b. means for locking the ring-shaped member is a desired position of adjustment.

5. The microscope of claim 4 wherein:
   a. the pinion shaft includes a housing having a knurled portion thereon, and b. the means for locking the ring-shaped member includes a set screw for engaging the knurled portion of the housing.

6. The microscope of claim 5 further including a removable protective housing carried by the knob for enclosing the slip clutch means.

7. The microscope of claim 4 further including a washer disposed between the ring-shaped member and the knob.

8. The microscope of claim 4 wherein:
a. the ring-shaped member is threadedly received on the pinion shaft, and
b. the means for locking the ring-shaped member includes:
  1. a washer disposed on one side of the ring-shaped member, and
  2. a lock nut disposed on the opposite side of the ring-shaped member for securing the latter against the washer.

9. The microscope of claim 1 wherein:
a. the pinion shaft includes a gearing means, and
b. the movable member includes a rack means for cooperative engagement with the gearing means.

10. The microscope of claim 9 wherein the pinion shaft includes a coaxial housing provided with an opening therein such that the gearing means engages the rack means through the opening.

11. The microscope of claim 9 wherein the rack means includes a first stop means at one extreme end of its travel and a second stop means at the other extreme end of its travel such that the resistance to rotation of the pinion shaft exceeds the predetermined amount of frictional resistance when either stop means engages the gearing means.

* * * * *